US012664036B2

(12) United States Patent
Dai et al.

(10) Patent No.: US 12,664,036 B2
(45) Date of Patent: Jun. 23, 2026

(54) ANOMALY DETECTION IN COMPUTER SYSTEMS

(71) Applicant: INTERNATIONAL BUSINESS MACHINES CORPORATION, Armonk, NY (US)

(72) Inventors: Yi Dai, Beijing (CN); Ling Zhuo, Beijing (CN); Ying Cao, Beijing (CN); Yin Xia, Beijing (CN); Junfei Shen, Hangzhou (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 940 days.

(21) Appl. No.: 17/844,357

(22) Filed: Jun. 20, 2022

(65) Prior Publication Data

US 2023/0409421 A1     Dec. 21, 2023

(51) Int. Cl.
*G06F 11/07*          (2006.01)
*G06F 18/211*        (2023.01)

(52) U.S. Cl.
CPC ...... *G06F 11/0751* (2013.01); *G06F 11/0709* (2013.01); *G06F 18/211* (2023.01)

(58) Field of Classification Search
CPC ... G06F 11/0751; G06F 18/211; G06N 20/00; G06N 3/02; G06V 10/764; G06V 20/52
See application file for complete search history.

(56) References Cited

U.S. PATENT DOCUMENTS

| | | | |
|---|---|---|---|
| 9,361,463 B2 | 6/2016 | Ferragut et al. | |
| 11,106,789 B2 | 8/2021 | Kraus et al. | |
| 11,108,621 B1 | 8/2021 | Shirvani et al. | |
| 2005/0216207 A1* | 9/2005 | Kermani | G16B 40/00 |
| | | | 702/20 |
| 2019/0373007 A1 | 12/2019 | Salunke et al. | |
| 2021/0026747 A1 | 1/2021 | Garion et al. | |
| 2021/0335004 A1* | 10/2021 | Zohar | G06T 7/74 |
| 2022/0019410 A1* | 1/2022 | Cangea | G06F 8/33 |

OTHER PUBLICATIONS

Z. Li, Y. Zhao, R. Liu and D. Pei, "Robust and Rapid Clustering of KPIs for Large-Scale Anomaly Detection, " 2018 IEEE/ACM 26th International Symposium on Quality of Service (IWQoS), Banff, AB, Canada, 2018, pp. 1-10, doi: 10.1109/IWQoS.2018.8624168. (Year: 2018).*
Xinfeng Zhang, Su Yang, Jiulong Zhang, Weishan Zhang, Video anomaly detection and localization using motion-field shape description and homogeneity testing, Pattern Recognition, vol. 105, 2020, 107394, ISSN 0031-3203, https://doi.org/10.1016/j.patcog.2020.107394. (Year: 2020).*
Zhang, Xinfeng, et al. "Video anomaly detection and localization using motion-field shape description and homogeneity testing." Pattern Recognition 105 (2020): 107394. (Year: 2020).*

* cited by examiner

*Primary Examiner* — Vincent Gonzales
*Assistant Examiner* — Pedro J Morales
(74) *Attorney, Agent, or Firm* — Robert R. Aragona

(57) ABSTRACT

First event data is obtained from a first computer system and second event data is obtained from a second computer system. A first shape of the first event data is identified, and a second shape of the second event data is identified. A shape similarity between the first shape and the second shape is calculated. The shape similarity is determined to be above a similarity threshold. Training features are generated from the first event data and the second event data based on the determining. The training features are input into an anomaly-detection model.

15 Claims, 7 Drawing Sheets

100

102

Obtain Subject-
System Event Data

104

Obtain Analogous
Foreign-System
Event Data

108

Standardize Event
Data

106

Metric Classification
and Selection

110

Generate Features for
Standardized and
Classified and
Selected Event Data

112

Combine Subject and
Foreign Feature Sets

114

Input Combined
Feature Sets Into
Anomaly-Detection
Model

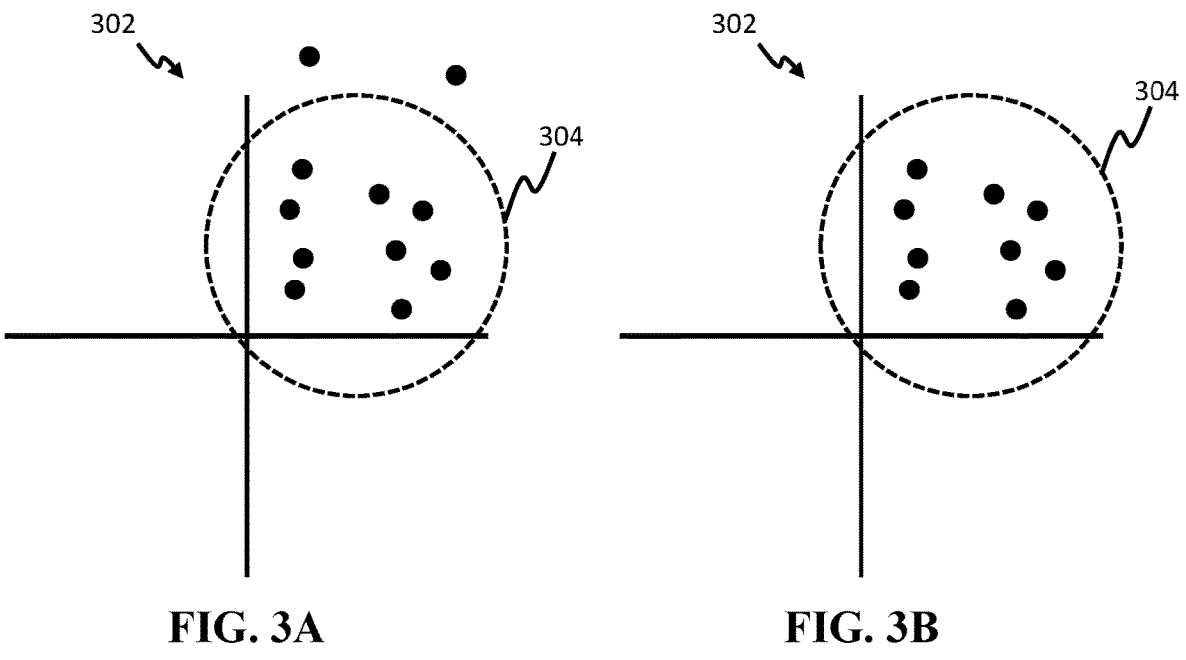
FIG. 3A                                    FIG. 3B
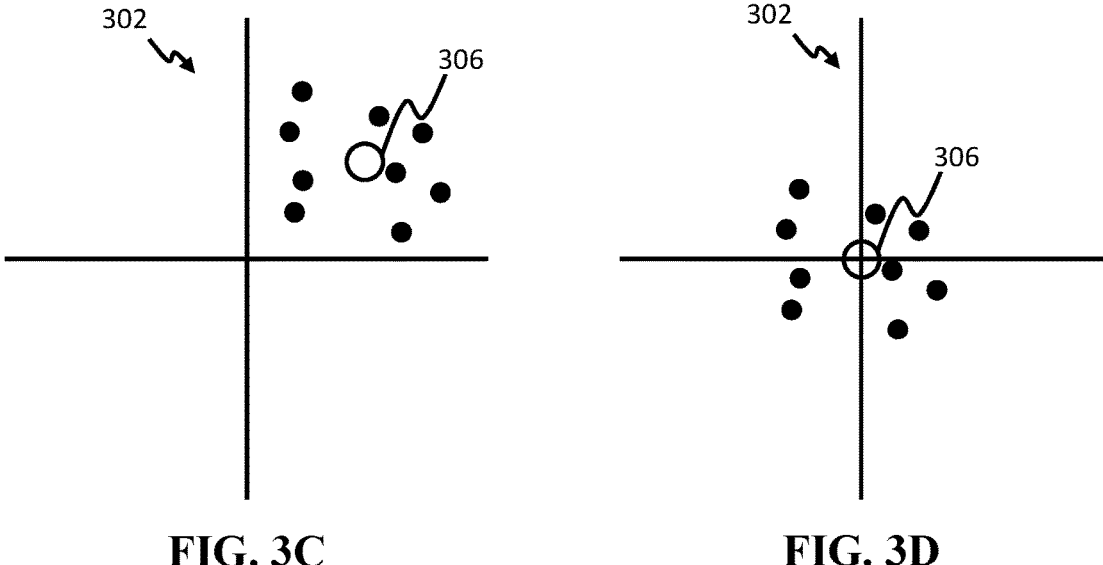
FIG. 3C                                    FIG. 3D

COMPUTER SYSTEM — 401

ANOMALY DETECTION IN COMPUTER SYSTEMS

BACKGROUND

The present invention relates to computer systems, and more specifically, to detection of anomalies in computer systems.

Computer systems, such as large databases, sometimes are of sufficient complexity that human monitoring is not a sufficient or practical method of identifying and diagnosing anomalies in the operation of those computer systems. Sometimes these anomalies may cause small errors or small performance degradation that is not noticed by system administrators, but that causes the system to operate less efficiently or less quickly. Sometimes these anomalies may cause larger errors that may result in the system no longer operating as intended, potentially losing significant amounts of data or productivity. In some instances, errors in complex computer systems, once noticed, can be difficult to diagnose and remedy.

Some complex computer systems take advantage of anomaly-detection models to aid in the detection and diagnosis of anomalous behavior. These models are typically trained based on data from previous system monitoring, such as system events monitored by a system administrator or a previous automated anomaly detection methods.

SUMMARY

Some embodiments of the present disclosure can be illustrated as a method. The method comprises obtaining first and second event data for a first computer system. The method also comprises identifying a first shape of the first event data and a second shape of the second event data. The method also comprises calculating a shape similarity between the first shape and the second shape. The method also comprises determining that the shape similarity is above a shape similarity is above a similarity threshold. The method also comprises generating, training features from the first event data and the second event data based on the determining. The method also comprises inputting the training features into an anomaly-detection model.

Some embodiments of the present disclosure can also be illustrated as a computer program product. The computer program product comprises a computer readable storage medium that has program instructions embodied therewith. The program instructions are executable by a computer to cause the computer to perform the above-described method.

Some embodiments of the present disclosure can also be illustrated as a system. The system comprises a processor and memory that is in communication with the processor. The memory contains program instructions. The program instructions are configured to cause the processor, when the processor executes the program instructions, to perform a method. The method comprises obtaining event data for a computer system. The method also comprises plotting the event data on a cartesian coordinate system. The method also comprises eliminating outlier data from the event data. The method also comprises converting the cartesian coordinate system to a polar coordinate system. The method also comprises generating a first set of training features from the first event data using the first polar coordinate system. The method also comprises inputting the first set of training features into an anomaly-detection model.

BRIEF DESCRIPTION OF THE DRAWINGS

FIG. 3A depicts a dataset during a first stage of data standardization, in accordance with embodiments of the present disclosure.

FIG. 3B depicts a dataset during a second stage of data standardization, in accordance with embodiments of the present disclosure.

FIG. 3C depicts a dataset during a third stage of data standardization, in accordance with embodiments of the present disclosure.

FIG. 3D depicts a dataset during a fourth stage of data standardization, in accordance with embodiments of the present disclosure.

DETAILED DESCRIPTION

Figure 1:
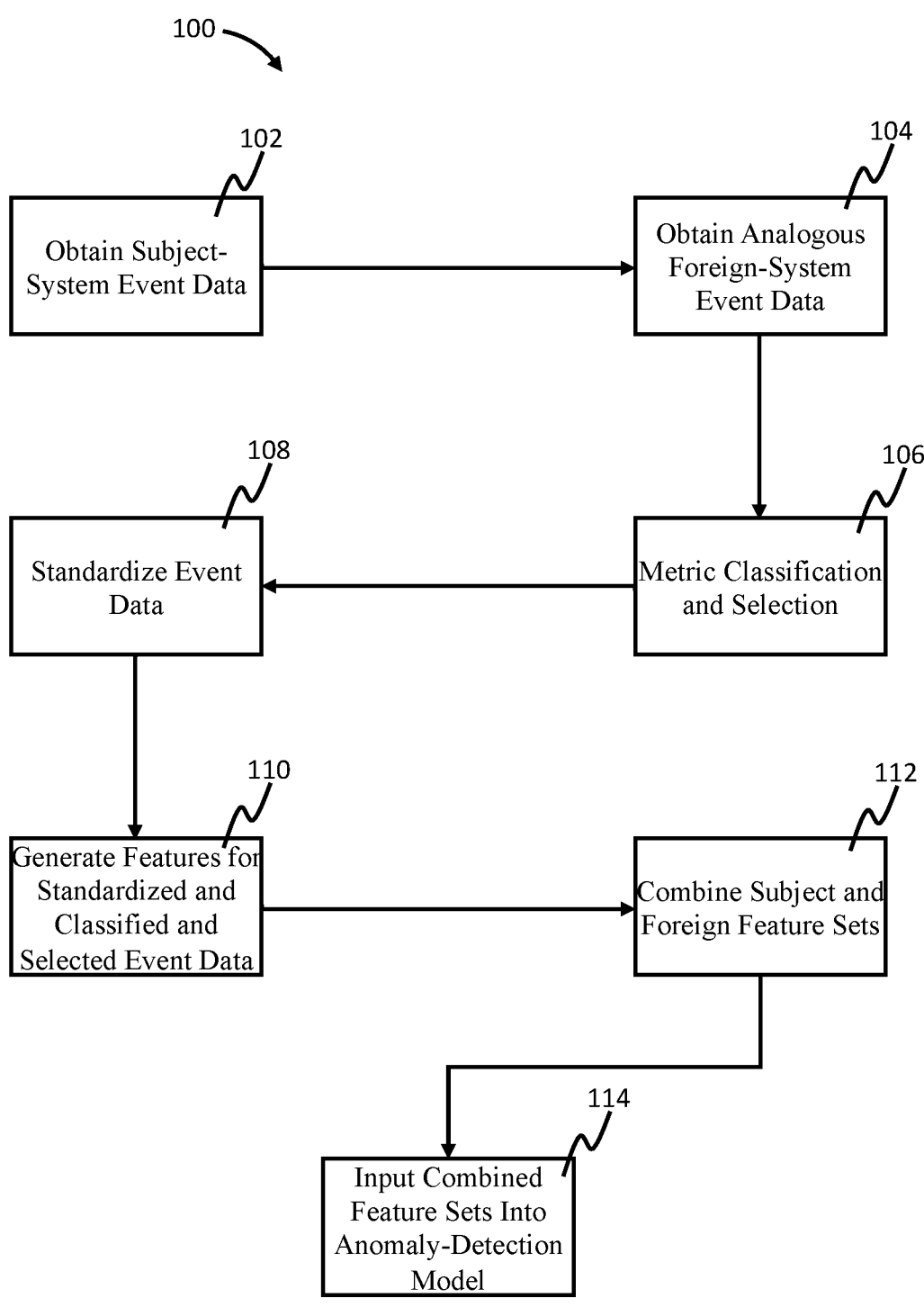
FIG. 1 depicts a method of training an anomaly-detection model in accordance with embodiments of the present disclosure.

Complex computer systems, such as large databases, can involve a large amount of operations between a variety of components and subsystems. In some of these complex systems, small or large unwanted behaviors (e.g., errors, unintended effects of new code, poor optimization between components) in any of these operations can lead to significant system issues. These issues may exist unnoticed in a system, degrading system performance, or may cause significant, even catastrophic system issues.

In some use cases, identifying these unwanted behaviors before system issues develop or persist can result in significant improvements to system performance. However, due to the large number of operations that may happen in these complex systems throughout each day, identifying unwanted behaviors in a timely manner through human monitoring is typically unfeasible. For this reason, maintenance of complex systems often takes advantage of automatic methods of detecting anomalous behavior within those computer systems.

For example, many monitoring systems monitor system event data (e.g., event logs, system alerts, usage metrics) for typical patterns in database operation. Deviations from those typical patterns are referred to herein as "anomalies,"

"anomaly events" or "anomalous behavior." These anomalies may sometimes be completely benign (e.g., false-positive error alerts), but oftentimes coexist with unwanted system behaviors that can cause system errors. Thus, detecting these anomalies can be beneficial in detecting and diagnosing unwanted behaviors before they significantly impact system performance.

Some automated monitoring systems involve training anomaly-detection models (e.g., neural networks) to analyze computer-system events in real time and identify anomalous events. A properly trained anomaly-detection model may be more efficient and accurate at detecting system anomalies than human system operators. However, properly training such models to precisely detect anomalies in a complex computer system can be difficult due limited training data that is applicable to that system. This is partially because training data that is used to train a model to detect anomalies in a particular computer system must typically be sufficiently similar to the data that is monitored for that particular system. In some instances, data from other sources (e.g., purchased training datasets, monitoring data from other computer systems operated by the same system administrators) can differ from the monitoring data of a particular system in important ways.

For example, in some instances training data from other sources (sometimes referred to herein as "foreign" training data) is recording using different data formats. Similar system events may be monitored using different time windows or tracked for different types of system alerts. In some instances, even if training data is recorded in an applicable format, the typical activity patterns within the training data (e.g., trends in system access failures) may be completely different from the typical activity pattens of the system for which a model is being trained, and thus deviations from those patterns (i.e., anomalies) may be completely irrelevant to deviations from the patterns of the system.

These issues may especially be true in particularly large and/or complex computer systems, which are often very customized. The combination of the complexity and customization typically found in these computer systems may cause foreign training data to be particularly inapplicable to the computer system. Unfortunately, as a computer system grows in size and complexity, the difficulty of monitoring the computer system for anomalies using other methods can also increase significantly. Thus, training these automated anomaly-detection models may be particularly important for systems for which only real-time training data from that system is available.

As noted, however, training a machine learning model to identify activity anomalies using only real-time data of the computer system for which the model is being trained can result in several issues. One potential issue is that the resulting model may be too sensitive, causing even the slightest deviation from the typical activity patterns of the system to be labeled as a dangerous anomaly. It may be possible to address this issue by establishing a warning threshold, but some warning thresholds may result in some potentially dangerous anomalies being ignored. A further issue is that the resulting model may be inadequately trained to respond to rare types of anomalies that infrequently arise in the system's operation or new types of anomalies that result from changes in the system's typical workflows or data throughout the lifetime of the system.

It may be possible, in some instances, to mitigate these issues by combining other monitoring methods, such as manual monitoring and review by system administrators or by combining multiple automated machine-learning models.

However, these mitigations may not only be insufficient, but also expensive and resource intensive.

Some embodiments of the present disclosure address some of the above issues by introducing new methods of training anomaly-detection models for complex computing systems (e.g., databases). These new methods are able to take advantage of training data that is sourced from other computer systems that would otherwise be inapplicable to detecting anomalies in the computer system for which the models are trained to monitor.

For the purpose of this disclosure, a computer system for which an anomaly-detection model is being trained may be referred to a subject computer system. Some embodiments of the present disclosure train such an anomaly-detection model using data that is gathered while monitoring the activity of a computer system. This data may include logs created during operation of a computer system (periodically generated logs or event logs), event reports, alerts, usage metrics (e.g., numbers of reads, writes, transfers, accesses, processes started or completed, requests received, etc.) or others. For the purpose of this disclosure, this data may be generically referred to as "event data," but may also be referred to as "training data" when described in the context of a training process. Event data that originated from the subject computer system may be referred to herein as "subject event data" or "subject training data."

Some embodiments of the present disclosure may combine subject event data with event data that is recorded from other computer systems. These other computer systems may be referred to as "foreign computer systems," and event data that originated from a foreign computer system may be referred to as "foreign event data" or "foreign training data."

Some embodiments of the present disclosure perform a data-adaptation process on foreign event data before combining with subject event data. This data-adaptation process may be useful for mitigating or eliminating the effects of differences between subject event data and foreign event data (e.g., differences between the format of collected event data, differences in observed patterns in the event data, differences between the processes by which the event data was monitored). In some embodiments, this same data-adaptation process may also be performed on data originating from the subject computer system. After the data-adaptation process, some methods of the present disclosure may generate training features from the adapted event data. Adapting the foreign event data (and potentially the subject event data) before feature generation may result in features from both the subject and foreign event data that are both applicable to training the same anomaly-detection model.

Some embodiments of the present disclosure may perform a data-adaption process on foreign event data without combining it with subject event data. This may be beneficial, for example, when training general-purpose anomaly-detection models for application to various potential subject computer systems, rather than a specific subject computer system. In these embodiments, similar data-adaptation methods may be performed on foreign event data, but no subject event data may be available for use as a reference. However, by adapting the foreign event data before feature generation in the absence of subject event data, the set of features that are generated from various foreign computer systems may still all be applicable to training a single anomaly-detection model. This anomaly-detection model may then be useful for detecting anomalies in various subject computer systems in the future.

In use cases in which a general-purpose anomaly-detection model is being trained without access to subject event data, a training system may select a foreign computer system and establish that foreign computer system as a "reference computer system." The foreign event data of that reference computer system may also be established as "reference event data." In these use cases, this "reference event data" may be treated as similarly to or even identically to the way subject event data of a subject computer system would be treated. As such, references throughout this disclosure to "subject event data" of a "subject computer system" when discussing the embodiments of this disclosure can be substituted with the above described "reference event data" of a "reference computer system" except where the context surrounding those references would otherwise deem that substitution inappropriate.

In some embodiments of the present disclosure, data adaptation may include a metric classification process, a standardization process, or both. Metric classification may involve analyzing foreign event data, identifying differences between the collection/format of the foreign event data and the collection/format of subject event data, and attempting to reduce or eliminate those difference. These differences, for example, may include differences in the lengths of the measurement windows during which event data (foreign or subject) is monitored and differences between the frequency with which event data is recorded during those windows.

Metric classification may also include analyzing a shape of event data when expressed as a visual graph. For example, an image-processing neural network may analyze a graph that expresses the typical number of system alerts in a subject computer system every hour over a typical, non-anomalous twenty-four hour period (i.e., a twenty-four hour period without any anomalous event patterns). The image-processing neural network may then assign an overall shape to the aggregation of data points plotted on that graph. That image-processing neural network may also perform a similar analysis and assignment on graphs that express the number of system alerts in a set of foreign computer systems. The resulting shapes may then be compared and foreign computer systems whose event data results in similar assigned shapes may be selected to provide training data for the anomaly-detection model.

Of note, in embodiments in which a general-use anomaly-detection model is being trained (e.g., embodiments in which no particular subject computer system has been selected), subject event data may be unavailable during metric classification. In these embodiments, metric classification may still be performed on foreign event data. For example, in some such embodiments, a single foreign computer system may be selected as a reference computer system, and the event data from that reference computer system subject event data for the purpose of metric classification. In this example, the shape of the foreign event data of this reference computer system may be treated as a reference shape, and other foreign computer systems whose event data results in assigned shapes that are similar to the reference shape may be selected to provide training data for the anomaly-detection model.

Standardization portions of data adaptation may include, for example, plotting a set of event data on a cartesian coordinate system and eliminating outlier data points. The remaining event-data points can then be converted to polar-coordinate plot by establishing the midpoint between the remaining event-data points as a pole and establishing a reference axis. In some embodiments, data points from event data from all sources (i.e., from subject computer systems and foreign computer systems) could also be normalized. This could be performed by, for example, identifying, in the polar-coordinate plot for each source, the data point with the farthest distance from the pole. The distance between the pole and that point may then be set to 1.0 for that plot, and all other points on that plot would then be expressed as a percentage of 1.0. In other words, the distance between all points on all plots and the poles of those plots could then be expressed as a value between 0.0 and 1.0.

After the data-adaptation process is completed, some embodiments of the present disclosure may generate training features from the resulting adapted event data. These features may be based, for example, on the standardized polar-coordinate plots created during the data standardization process. Example training features may include, for example, a vector that contains the distance value between each data point and the pole for a given measurement window, a vector that contains the angle between each data point and the reference axis for a given measurement window, a vector that contains the average distance of all points in each measurement window during a longer measurement period, patterns in the changes of the distance between data points and the pole or in the angle between the data points and the reference axis, etc.

Generating features for the subject computer system and foreign computer systems after data adaptation may enable all those features to be input into an anomaly-detection model that is being trained to monitor the subject computer system. The data adaptation process may mitigate or eliminate issues that may have resulted by attempting to train the anomaly-detection model with data that was not applicable to the subject computer system.

In some embodiments, features generated from foreign computer system event data may be combined into a single data set of features after feature generation. In some embodiments, features from these sets may be labeled as containing or not containing anomalous events. Labeling features with anomalous events may assist in training the anomaly-recognition model to identify patterns associated with types of anomalous events that have not yet occurred in the subject computer system.

For ease of understanding, FIG. 1 depicts an example method 100 of training an anomaly-detection model in accordance with embodiments of the present disclosure. Method 100 may be performed, for example, by a computer system, such as computer system 401, that is configured to automatically adapt event data from foreign computer systems for training an anomaly-detection model for a subject computer system. For the purpose of this discussion, method 100 will be discussed as performed by a "training system," which may resemble computer system 401.

Of note, method 100 may also be performed to automatically adapt event data from foreign computer systems for training a general-purpose anomaly-detection model, without a particular subject computer system. As noted above, this may involve establishing a foreign computer system as a reference computer system and establishing the foreign event data from that reference computer system as reference event data. In some embodiments, this reference event data, while not from a subject computer system, may be treated as subject event data for the purposes of method 100.

Method 100 begins in block 102, in which the training system obtains event data from the subject computer system. Data obtained from the subject computer system may be a mixture of stored historical training data and real-time data (e.g., data from the most recent monitoring periods, such as the current day). The nature of the event data obtained at block 102 may depend upon the type of data that is monitored during normal operation of the subject computer system. For example, if an anomaly-detection model will only have access to event logs while monitoring the subject computer system, block 102 may only obtain event logs. If, on the other hand, the anomaly-detection model will have access to a recorded value that expresses the number of alerts during the past monitoring window, block 102 may obtain those recorded values. In some instances, the anomaly-detection model may also have access to usage metrics for the subject computer system, such as numbers of reads and writes, transfers, accesses, completion time for workloads, cache misses, etc. In these instances, the training system may also obtain those usage metrics in block 102.

Of note, in use cases in which method 100 is being used for training a general-purpose anomaly-detection model (without a particular subject computer system), a training system performing method 100 may not have access to subject-system event data. In that instance, obtaining event data from the subject computer system of block 102 may be replaced with obtaining foreign event data from a foreign computer system and establishing that foreign event data as reference event data. The remainder of method 100 may operate similarly after this point. However, any further references to a "subject computer system" would, in these use cases, be replaced by the reference computer system, and any further references to "subject event data" would, in these use cases, be replaced by the reference event data.

In block 104, the training system may obtain analogous event data from one or more foreign computer systems (in other words, foreign event data). In some embodiments, this foreign event data may be available from a corpus of training data specifically obtained for the purpose of training anomaly-detection systems. In such embodiments, this foreign event data may originally have been sourced from foreign computer systems to which the training system has no access. In some embodiments, the foreign event data obtained in block 104 may also be obtained from other computer systems to which the training system has access. For example, the training system may be operated by an organization that provides cloud-hosting services (e.g., hosting of large, customized databases) for large companies. In such embodiments, the subject computer system may be one of those cloud-hosted systems that is provided for a customer, and the foreign computer systems may be other computer systems that the organization provides for that customer or for other customers.

The foreign event data obtained at block 104 may be analogous in the sense that it is the same type of data that is obtained in block 102. For example, if the training system obtained event logs and usage metrics for the subject computer system in block 102, the training system may obtain event logs and usage metrics for the foreign computer system (or systems) in block 104.

Upon obtaining the subject event data in block 102 and foreign event data in block 104, the training system performs a metric classification process for both systems in block 106. The main effect of block 106 may be to adapt foreign event data such that it is applicable to the subject computer system and selecting foreign event data that is both non-anomalous and that exhibits patterns that are similar to the patterns exhibited by the non-anomalous subject event data.

For example, the subject event data may comprise a number of alert events for every 5-minute interval in a 24-hour measurement window. When not experiencing anomalous events, the subject computer system may produce a large spike of alert events every morning at 4 AM and every evening at 5 PM when a connected database reboots.

In this instance, block 106 may select foreign event data whose alert events also spike in number every morning and evening.

In some embodiments, block 106 may include expressing the subject event data and foreign event data for each foreign computer system in separate graphs. These graphs may, for example, express the number of events on the Y axis and time on the X axis. In some embodiments, the training system performing method 100 may standardize these graphs by finding a common denominator between the measurement frequency on the X axis. For example, if the subject event data recorded event logs every five minutes, but a foreign computer system recorded event logs every 10 minutes, the training computer system may create an estimated 5-minute data point midway between each actual 10-minute data point on the foreign-event-data graph. Thus, each graph would have the measurement frequency, and thus the same number of data points in a measurement window of the same length.

In some embodiments, the training system performing method 100 may also create a common measurement window on the X axis. For example, if the event data for the subject computer system is collected into measurement windows of 24 hours, but the event data for a foreign computer system is collected into measurement windows of 12 hours, the training system may combine every two measurement windows of the foreign computer system such that each measurement window is 24 hours long.

In some embodiments, the training system performing method 100 may also analyze the graphs created in block 106 and attempt to create shapes that generally fit the visualized data points. For example, the training system may include or utilize an image-processing neural network that may analyze pictures of each graph and identify a general shape of the data in each graph. The training system may also calculate a similarity between these shapes to determine whether the foreign event data expresses patterns that are similar to the subject event data. For example, the two shapes could be overlayed on top of each other and a percentage of space (or number of pixels) that the shapes overlap could be compared to the percentage of space (or number of pixels) that the shapes do not overlap. The training system may, in block 106, calculate a shape similarity value for the shapes and compare it to a similarity threshold. If the shape similarity value is over the similarity threshold, the training system may select that event data for training the anomaly-detection model.

Method 100 may also include standardizing event data in block 108. The main effect of block 108 may be to express data from all sources (i.e., subject computer systems and foreign computer systems) in the same, basic format. In some embodiments, the training system may perform block 108 on all event data that was obtained in blocks 102 and 104. In other embodiments, the training system may perform block 108 only on event data that was selected during the metric classification process in block 106. In some embodiments, the event data that is standardized in block 108 may include both anomalous and non-anomalous data.

In block 108, the training system may graph the event data on a cartesian coordinate plot. For example, each event data type (e.g., numbers of alert events per time period, transfer requests per time period) for each source (e.g., historical data from the subject computer system, real-time data from the subject computer system, and data from each foreign system) may be expressed on a separate plot. The training system may then remove outlier data from each graph. The method by which the training system identifies outlier data may vary, but one example includes identifying the top 5% and bottom 5% values and removing them. Further methods of identifying outlier data are discussed in connection to FIGS. 3A-3B.

Block 108 may also include converting the cartesian coordinate plot to a polar coordinate plot. The training system may, for example, identify the midpoint of the non-outlier data and establish that midpoint as the polar pole. The training system may also identify a reference axis (also sometimes referred to as a reference direction), such as the Y axis above the midpoint. This may enable expressing every point on the polar coordinate plot as a combination of a distance from the midpoint and an angle between the point and the reference axis. In some embodiments, historical event data and real-time event data for the subject computer system may be combined at this stage.

In some embodiments, the distance to the origin may be normalized for each plot. For example, the training system may select the data point that is the farthest distance from the midpoint on the plot and establish that distance as 100. The distance between all other data points and the midpoint may then be expressed as a distance between 0 and 100. Repeating that process for all plots (e.g., all foreign computer system plots) may cause all data points for all event data to be expressible as a distance between 0 and 100 and an angle.

After standardizing event data in block 108 and performing metric classification and selection in block 106, the training system may, in block 110, generate training features for the classified, selected, and standardized event data. The purpose of generating training features is to create actual features from both the subject computer system and foreign computer systems that could be input into an anomaly-detection model that is being trained for the subject computer system. The exact features chosen by the training system may vary based on the resources available, the use case of the subject computer system, and capabilities of the training computer system. However, in some embodiments the features may include properties of and patterns derived from the standardized polar coordinate plots created in block 108. Further information about these features is discussed in connection with FIGS. 3F and 3G.

Upon generating the training features in block 110, the training system combines, in block 112, the features created from the subject event data and the features created from the foreign event data. In some embodiments, this may simply involve grouping the features together so they can all be input into the anomaly-detection model together. In some embodiments, the training system may also identify features that are associated with (e.g., were generated from) event data that contain anomalous events. In some embodiments, block 112 may also include incorporating training data that has not been processed by a data adaptation process (e.g., the combination of blocks 106 and 108).

In block 114, the training system that is performing method 100 inputs the combined feature sets into the anomaly-detection model. The anomaly-detection model may thus be trained not only on event data that is sourced from the subject computer system, but also from one or more foreign computer systems. Further, the data adaptation process performed prior to block 114 may also eliminate any negative effects of incorporating data from foreign sources that is not applicable to the subject computer system. This may significantly increase the accuracy of the resulting anomaly-detection model, and also increase its ability to adapt to changes in the subject computer system (e.g., evolving workloads).

Figure 2A:
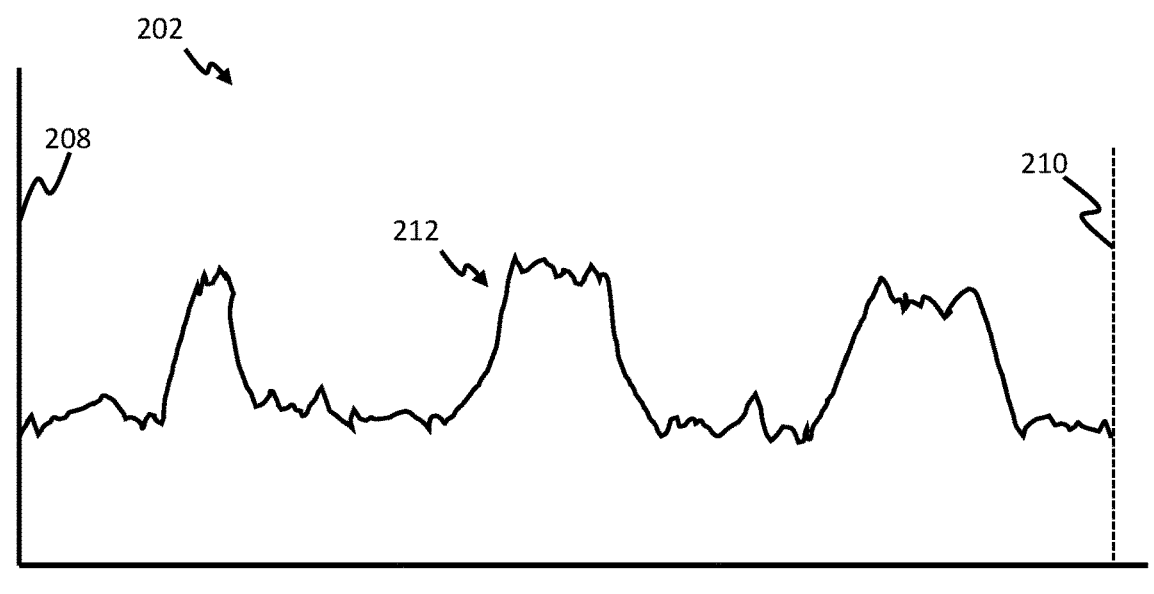
FIG. 2A depicts a graph of subject event data and two graphs of foreign event data during a first stage of metric classification, in accordance with embodiments of the present disclosure.
Figure 2A:
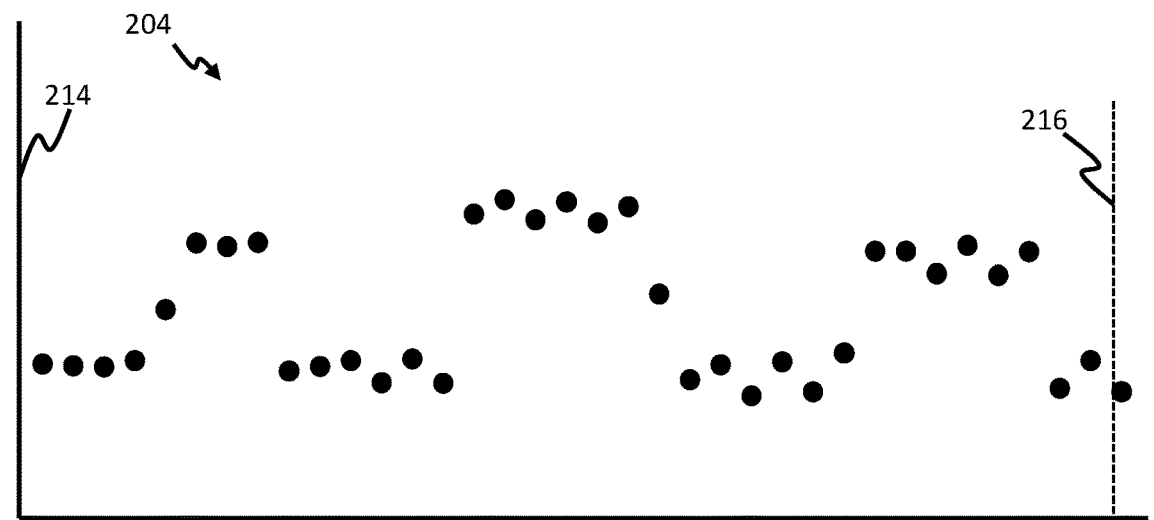
Figure 2A:
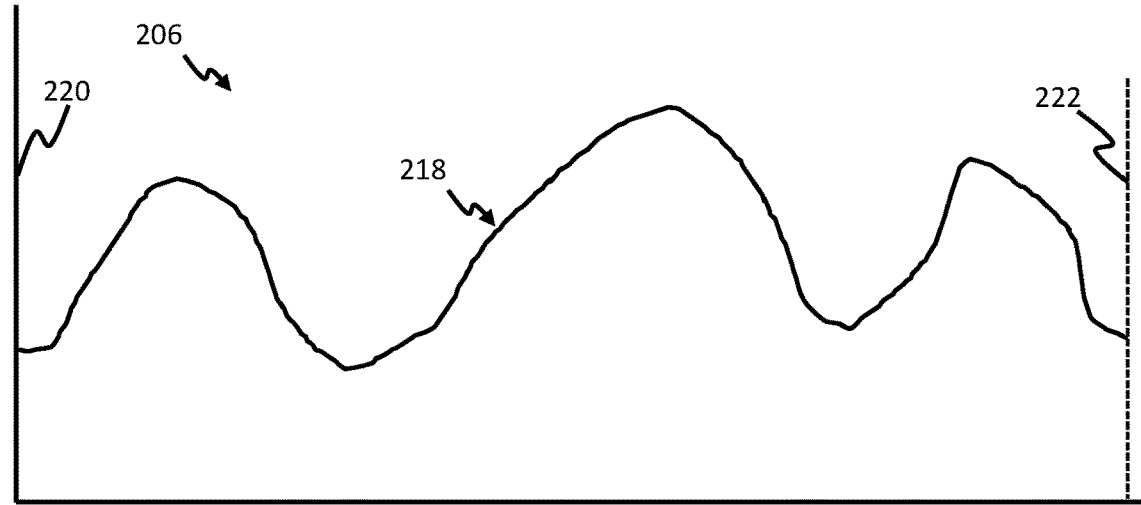
Figure 2B:
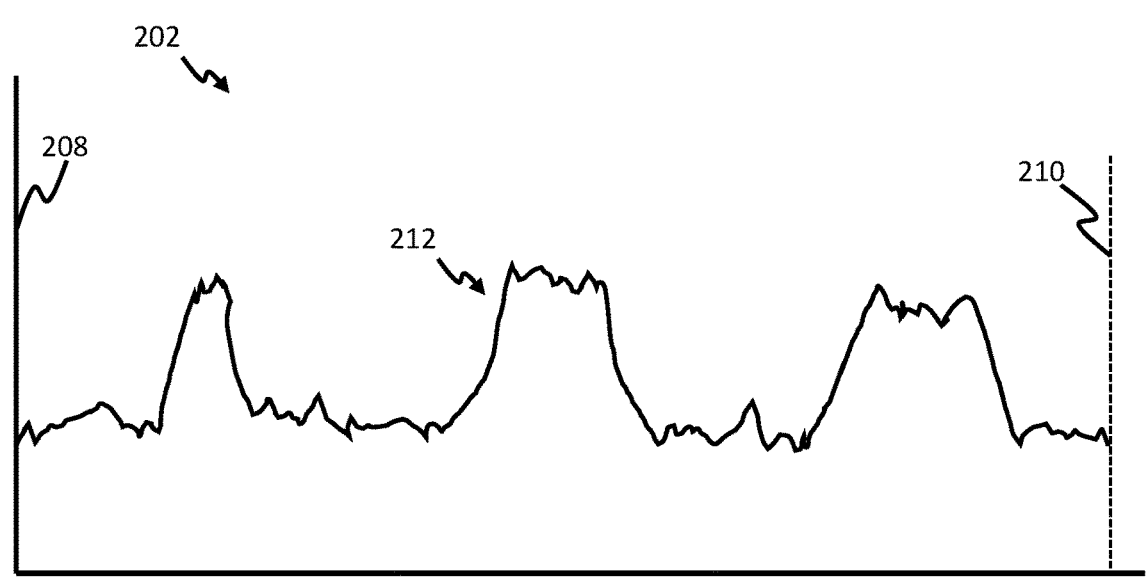
FIG. 2B depicts the graph of subject event data and two graphs of foreign event data during a second stage of metric classification, in accordance with embodiments of the present disclosure.
Figure 2B:
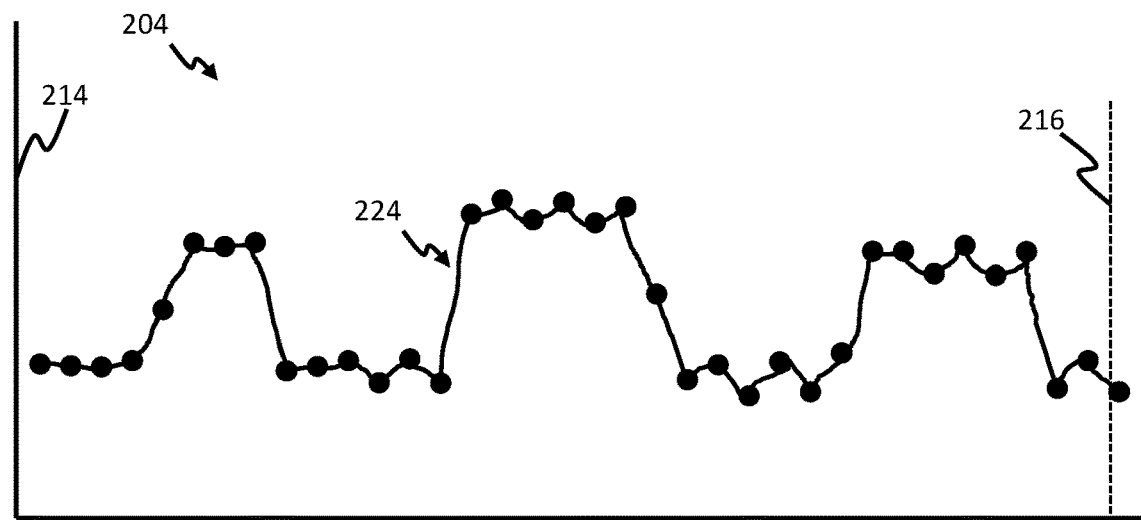
Figure 2B:
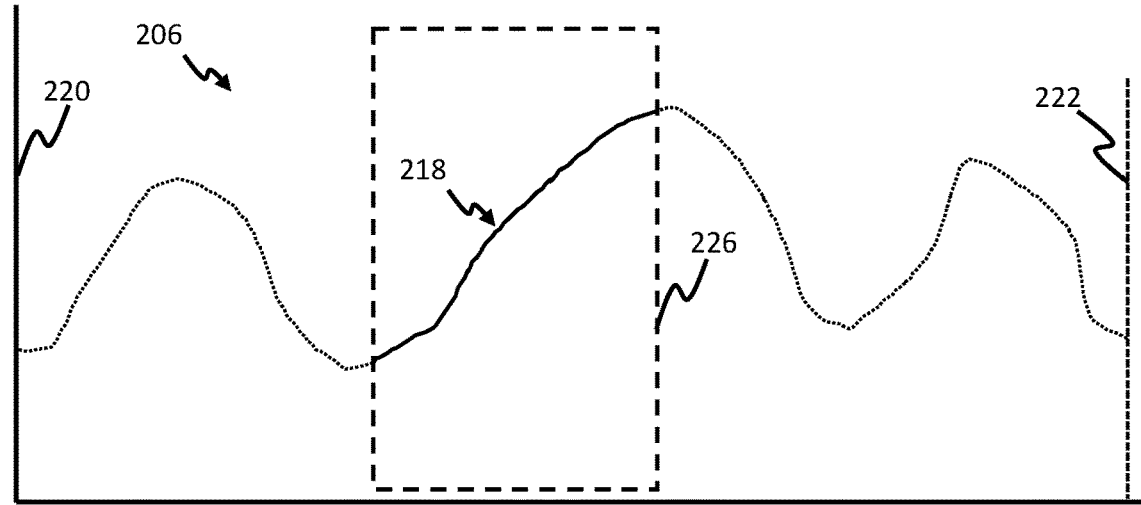
Figure 2C:
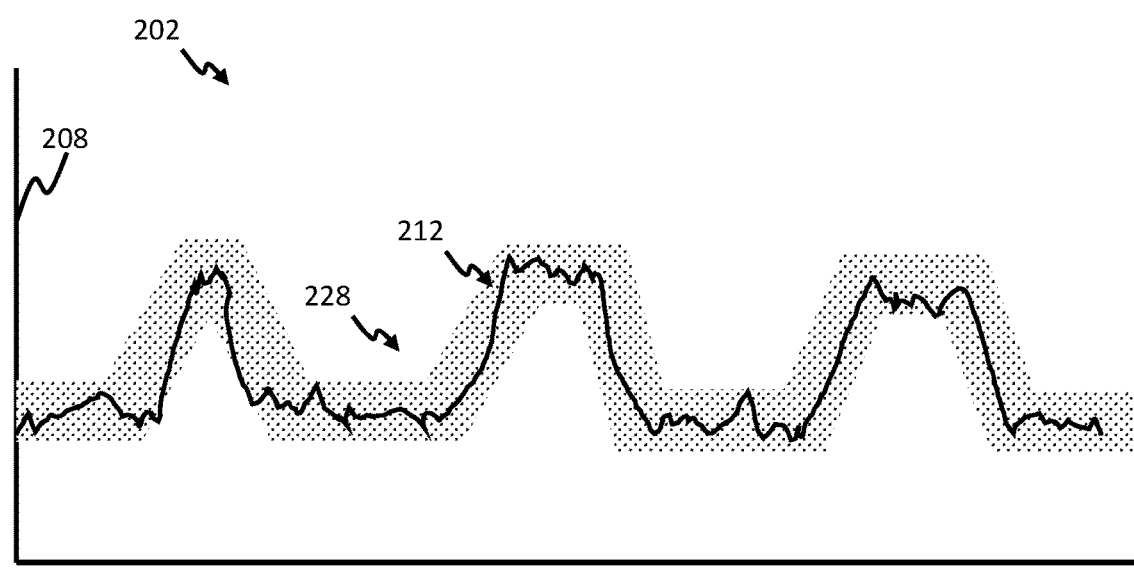
FIG. 2C depicts the graph of subject event data and two graphs of foreign event data during a third stage of metric classification, in accordance with embodiments of the present disclosure.
Figure 2C:
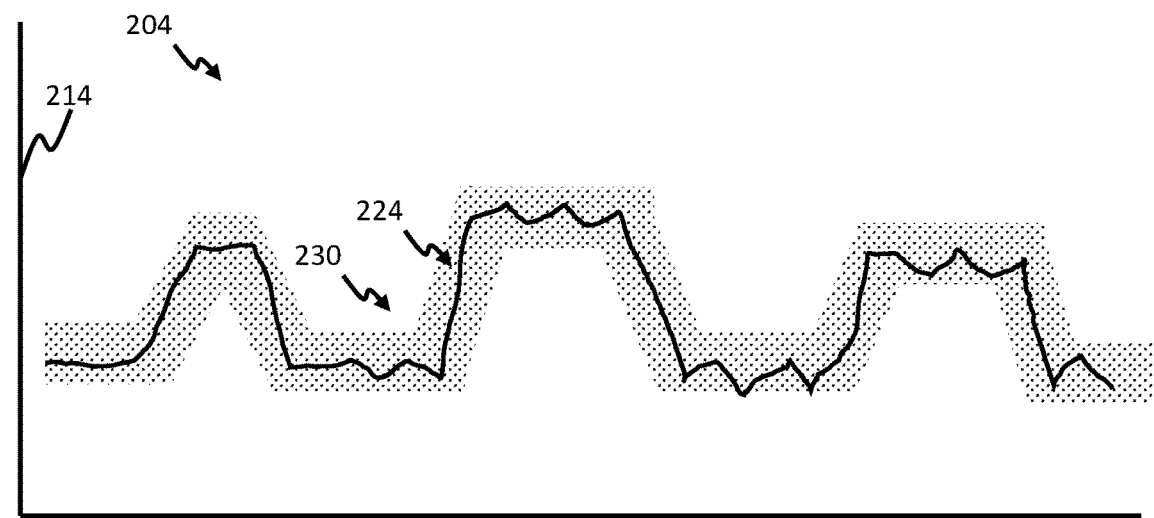
Figure 2C:
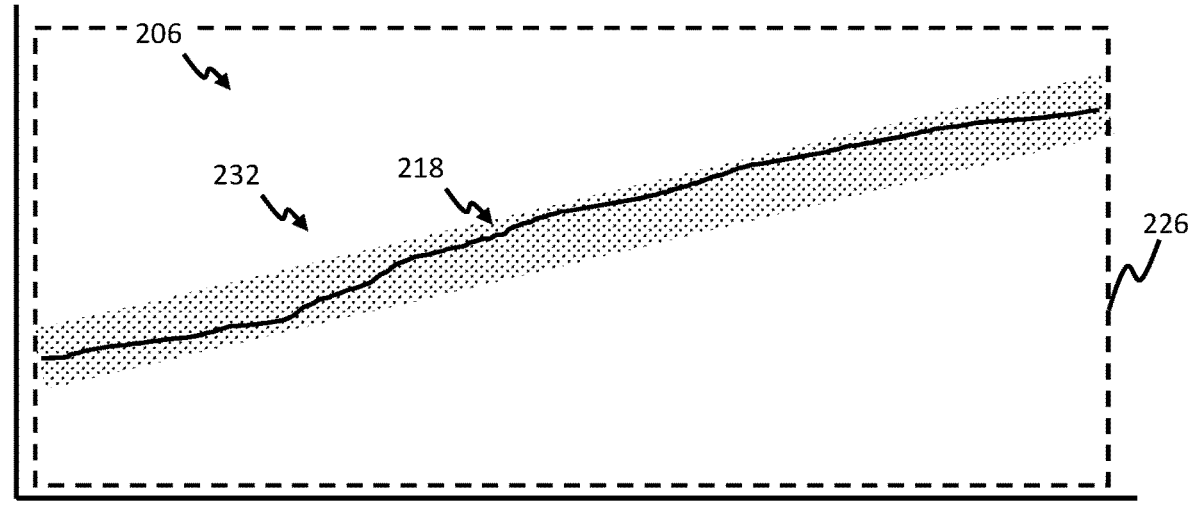

FIGS. 2A-2C depict a set of event-data graphs that are processed through metric classification. For example, FIG. 2A depicts a graph 202 of subject event data and two graphs 204 and 206 of foreign event data during a first stage of metric classification, in accordance with embodiments of the present disclosure. The event data expressed in graphs 202, 204, and 206 may represent event data that is monitored during typical operation of their respective computer systems, and may not contain any anomalous events. This may be useful in identifying foreign computer systems that have similar baseline patterns to the subject computer system.

As illustrated, graph 202 depicts a graph event data in a measurement window between Y axis 208 and reference axis 210. The continuity and localized variability of the curve 212 in graph 202 suggests that the subject event data for graph 202 was measured with a high measurement frequency during that measurement window. Graph 202 may, for example, illustrate a number of event logs recorded in a subject computer system every minute in a 24-hour period.

Graph 204 may depict the monitoring data of a foreign computer system with the same measurement window as graph 202, and thus the distance between Y axis 214 and reference axis 216 may also represent a 24-hour period. However, the relative few datapoints illustrated in graph 204 as compared to graph 202 may suggest that the foreign event data for graph 204 was measured with a far lower measurement frequency during that measurement window. Graph 202, may, for example, illustrate a number of event logs recorded in a subject computer system every minutes in a 24-hour period.

Graph 206 may depict the monitoring data of a second foreign computer system. While the general appearance of curve 218 in graph 206 may at first appear more similar to curve 212 of graph 202 than the isolated datapoints of graph 204, the foreign event data expressed in graph 206 may have been measured over a 5-day measurement window, rather than a 24-hour measurement window. In other words, the space between Y axis 220 and reference axis 222 may span 5 days, rather than 24 hours. As will be illustrated in FIGS. 2B and 2C, this may make the foreign event data expressed in graph 206 non-applicable to the subject computer system.

FIG. 2B depicts the graph 202 of subject event data and two graphs 204 and 206 of foreign event data during a second stage of metric classification, in accordance with embodiments of the present disclosure. As illustrated in FIG. 2B, an estimated curve 224 has been fit to the data points expressed in graph 204. This estimated curve 224 can be utilized to derive additional estimated measurement points for the foreign event data in graph 204, enabling the foreign event data to be expressed with the same measurement frequency (e.g., 60 measurements per hour) as the subject event data in graph 202. This may be referred to, for example, as equalizing the measurement frequencies between the subject event data in graph 202 and the foreign event data in graph 204.

As is also illustrated in FIG. 2B, reference window 226 has been added to graph 206 to represent the measurement window during which the subject event data in graph 202 and the foreign event data in graph 204 was monitored. In other words, the foreign data within reference window 226 may span a 24-hour period. In some embodiments, the precise location of reference window 226 within graph 206 may be based upon the circumstances and usage patterns of the subject computer system. For example, the subject computer system may repeat the same general patterns every calendar day, in which case reference window 226 may span from midnight to 11:59 PM of any given calendar day. If the subject computer system exhibits patterns based on whether the measurement window occurs on a weekday or weekend, the reference window 226 may be placed on a corresponding weekday or weekend. Similarly, if the subject computer system exhibits different patterns based on the date of a month, reference window 226 may be placed on a corresponding date. As will be illustrated in FIG. 2C, the event data outside of reference window 22 may be discarded, and graph 206 may be resized such that the distance between Y axis 208 and reference axis 210 is the same as the horizontal distance within measurement window 226. The process of selecting and placing a reference window and resizing a graph accordingly may be referred to, for example, as equalizing the measurement windows between the subject event data in graph 202 and the foreign event data in graph 206.

FIG. 2C depicts the graph 202 of subject event data and two graphs 204 and 206 of foreign event data during a third stage of metric classification, in accordance with embodiments of the present disclosure. FIG. 2C may represent graphs 202, 204, and 206 as analyzed by an image-processing model that is configured to assign a generalized shape to the data expressed by each graph.

For example, an image-processing model may assign the zig-zag shape 228 to the subject event data expressed in graph 202. This shape is illustrated in FIG. 2C as a shaded background behind curve 212. The image-processing model may also assign the zig-zag shape 230 to the foreign event data expressed in graph 204. This shape is illustrated in FIG. 2C as a shaded background behind curve 224. Finally, the image-processing model may also assign the sloped shape 232 to the foreign event data expressed in graph 204. This shape is illustrated in FIG. 2C as a shaded background behind curve 218.

As is clear in FIG. 2C, after equalizing the measurement frequencies of the subject event data and the foreign event data in graph 202 and the foreign event data in graph 206, the shape of curve 224 appears much more similar to the shape of curve 212 than the shape of curve 218 does. For example, a training system may analyze shapes 228 and 230 and shapes 228 and 232 by calculating a percentage similarity between the pairs of shapes and comparing them to a similarity threshold (e.g., 70%). If such a training system determined that shapes 228 and 230 were 80% similar, the training system may determine that the percentage similarity between those two shapes is above a similarity threshold of 75%. This may cause the training system to select the foreign event data expressed in graph 204 for training an anomaly detection data.

However, if the training system also determined that shapes 228 and 232 were only 10% similar, the training system may determine that the percentage similarity between those two shapes is below a similarity threshold, and may discard the foreign event data expressed in graph 206.

Figures 3E, 3F:
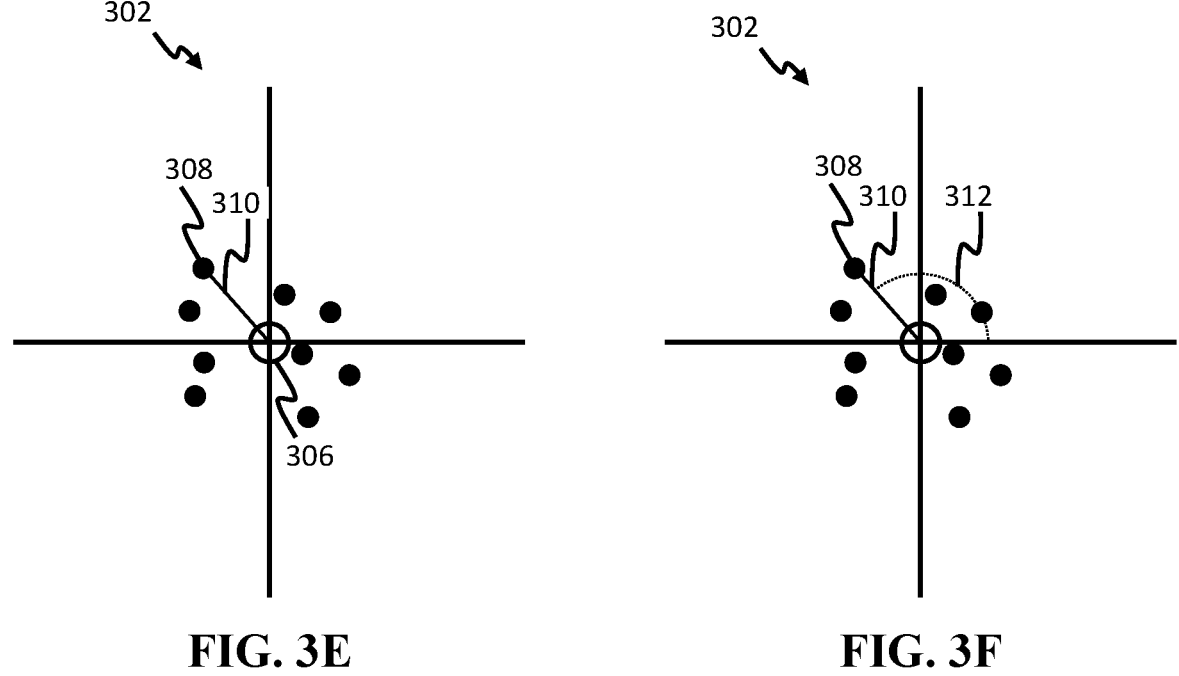
FIG. 3E depicts a dataset during a fifth stage of data standardization, in accordance with embodiments of the present disclosure.
FIG. 3F depicts a first example of feature generation from the dataset after data standardization, in accordance with embodiments of the present disclosure.

For ease of understanding, FIGS. 3A-3G depict a dataset of event data during standardization process and feature generation, in accordance with embodiments of the present disclosure. FIG. 3A depicts graph 302, in which the event data of a computer system (e.g., a foreign computer system of a subject computer system) is expressed. Graph 302 may represent, for example, the numbers of cache misses every minute of a foreign computer system. In some embodiments, the data in graph 302 may have been selected for training as part of a metric classification process, similar to that discussed with connection to block 106 or FIGS. 2A-2C. In some embodiments, the data in graph 302 may not have been processed through metric classification.

In the standardization stage illustrated in FIG. 3A, graph 302 expresses all event data as data points in a cartesian coordinate space. The data points outside outline 304, however, represent data that are considered outliers. These outliers may have been identified by calculating the top X % and bottom Y % of the data range (e.g., top 10% and bottom 10%). In some embodiments, other methods to identify and remove outliers, such as identifying data points beyond a pre-determined number of standard deviations away from a mean, 3-sigma method, or Tukey's test, may also have been used. As illustrated in FIG. 3B, graph 302 has been adjusted by removing outlier beyond outline 304.

In the standardization stage illustrated in FIG. 3C, graph 302 has begun to be converted to a polar coordinate system. Specifically, the midpoint 306 between the datapoints remaining in graph 302 has been calculated. This midpoint 306 is then used as the origin pole in FIG. 3D, effectively shifting the X and Y axes. A reference axis (also referred to as a reference direction) may also be selected at this stage. For example, the X axis to the right of the pole may be selected as a reference axis.

In FIG. 3E, the distance between the data points on the polar coordinate graph and the pole may be standardized. As illustrated, data point 308 is the farthest point away from the pole at 306. Thus, for this reason, data point 308 may be identified as a reference distance data point. The distance between point 308 and the pole, depicted as line 310, may be set as equal to 1.0. The remaining data points may then be expressed as a proportion of the distance between the reference distance data point and the pole. Thus, the distances between all datapoints in graph 302 and the pole may be expressed as a number between 0.0 and 1.0. This may facilitate the use of those distances in training an anomaly-detection model using feature vectors, as many feature vectors take the form of a series of values between 0.0 and 1.0.

FIG. 3F depicts a first example of feature generation from the dataset after data standardization illustrated in FIGS. 3A-3E, in accordance with embodiments of the present disclosure. For example, the properties of the event data expressed by data point 308 can be illustrated as a distance value between data point 308 and the pole, illustrated by line 310, and an angle value between data point 308 and the reference axis, illustrated by arc 312. In some embodiments, this angle may also be expressed as a value between 0.0 and 1.0. In such embodiments, 0.0 may reflect an angle of 0.0 degrees, and 1.0 may reflect an angle of 360 degrees.

Figure 3G:
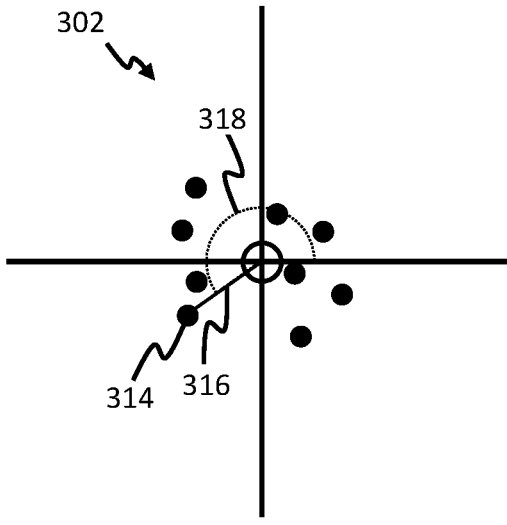
FIG. 3G depicts a second example of feature generation from the dataset after data standardization, in accordance with embodiments of the present disclosure.

FIG. 3G depicts a second example of feature generation from the dataset after data standardization illustrated in FIGS. 3A-3E, in accordance with embodiments of the present disclosure. Like data point 308, the properties of data point 314 can be expressed as a distance value between data point 314 and the pole, illustrated by line 316, and an angle value between data point 314 and the reference axis, illustrated by arc 318.

In some embodiments, feature generation may include various analyses of the polar-coordinate data that can be derived from graph 302. For example, in some embodiments feature generation may include collecting the distances between all points on graph 302 and the pole and inserting them into a feature vector. In similar embodiments, the angle between all points and the reference axis may be inserted into a feature vector. In some embodiments, a feature vector may contain alternating distance values and angle values, such that the distance and angle of a data point are given in a consecutive pair of values. In some embodiments patterns of the distance values and angle values may also be used to generate feature vectors. For example, if graph 302 represented event data from a single measurement window, the generalized properties of graph 302 could be combined into a feature vector with the generalized properties of graphs from other measurement windows for the same system. For example, the average distance between data points and the pole for each measurement window for the subject computer system may be contained in a feature vector. Trends in the distance from the pole and angle from the reference axis could also be expressed. For example, a rate of change of the average angle from the reference axis could be calculated between each subsequent measurement window (e.g., a first hour-long measurement window between 2 and 3 PM and a second hour-long measurement window between 3 and 4 PM). Patterns in the standard deviations of distance or angles between measurement windows could also be used to generate features, as well as the gradient between measurement windows (e.g., which data points are changing the fastest?).

As noted above, the data expressed in graph 302 may have already gone through a metric classification and selection process, such as the processes described in connection to block 106 and FIGS. 2A-2C. In such embodiments, the data that is standardized as shown in FIGS. 3A-3E may be ready for training an anomaly-detection model after feature generation. However, in some embodiments the standardization process that is illustrated in FIGS. 3A-3E, and potentially the subsequent feature generation, may occur before or at the same time as metric classification. In these embodiments, the data that is standardized, as illustrated in FIGS. 3A-3E, and the features generated from that standardized data, may be cross referenced with the data that is selected as part of the metric classification. In these embodiments, only standardized data/generated features that were also selected as part of metric classification (e.g., the foreign event data illustrated by graph 204) may be ultimately utilized when training an anomaly-detection model for a subject computer system.

Figure 4:
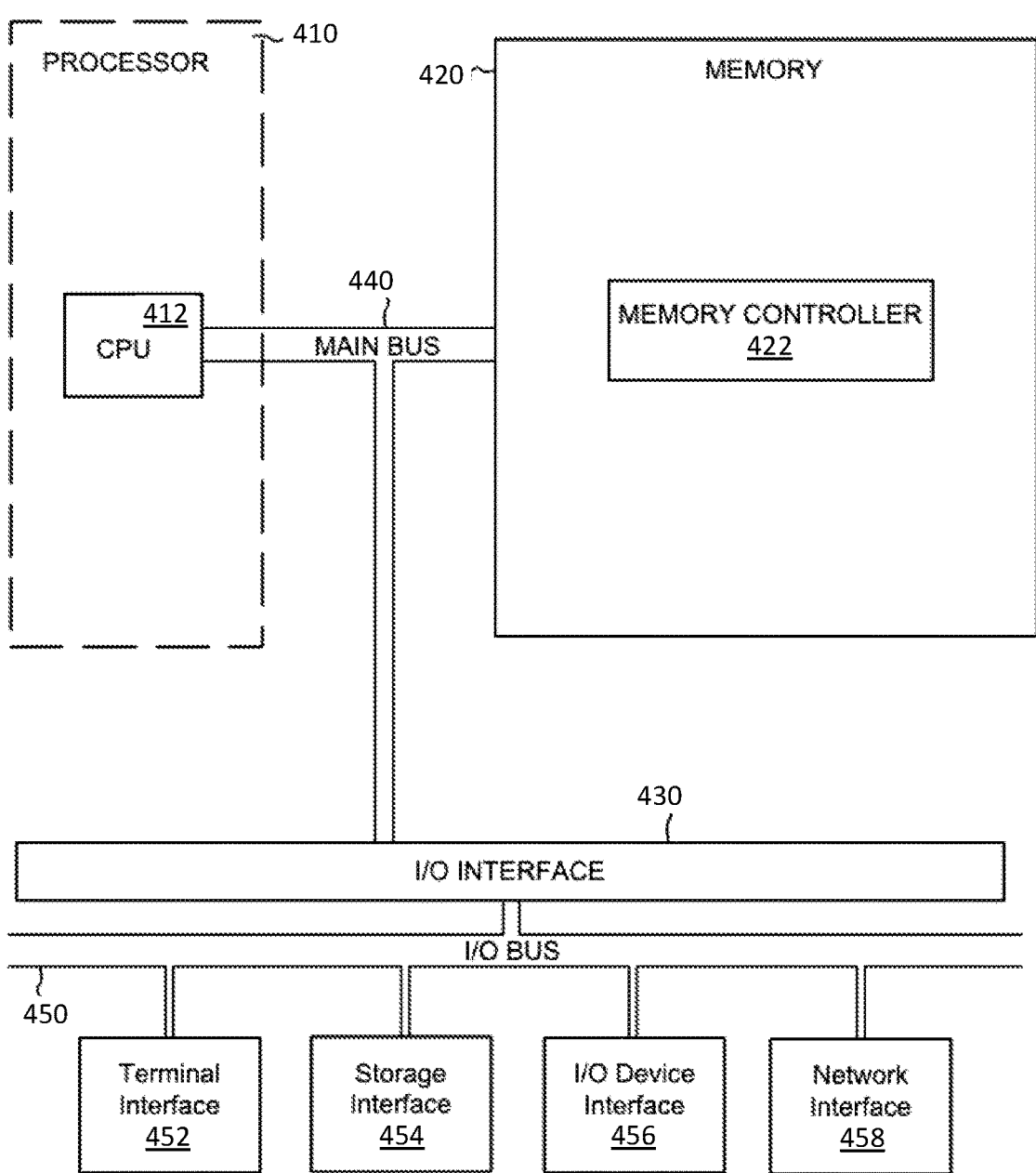
FIG. 4 depicts the representative major components of an example Computer System that may be used in accordance with embodiments of the present disclosure.

FIG. 4 depicts the representative major components of an example Computer System 401 that may be used in accordance with embodiments of the present disclosure. Computer System 401 may be, for example, a training system. The particular components depicted are presented for the purpose of example only and are not necessarily the only such variations. The Computer System 401 may include a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may include one or more CPUs 412. The Processor 410 may additionally include one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may include one or more circuits configured to perform one or more methods consistent with embodiments of the present disclosure. In some embodiments, the Computer System 401 may contain multiple Processors 410 typical of a relatively large system. In other embodiments, however, the Computer System 401 may contain a single processor with a singular CPU 412.

The Memory 420 of the Computer System 401 may include a Memory Controller 422 and one or more memory modules for temporarily or permanently storing data (not depicted). In some embodiments, the Memory 420 may include a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may include an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may include the Terminal Interface 452, the Storage Interface 454, the I/O Device Interface 456, and the Network Interface 458. In some embodiments, the various interfaces may include a subset of the aforementioned interfaces (e.g., an embedded computer system in an industrial application may not include the Terminal Interface 452 and the Storage Interface 454).

Logic modules throughout the Computer System 401— including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

obtaining first event data for a first computer system, wherein the first computer system is a computer system for which an anomaly-detection model is being trained, wherein the first event data includes subject event data originating from the first computer system;

obtaining second event data for a second computer system, wherein the second computer system is a computer system other than the first computer system, wherein the second event data includes foreign event data originating from the second computer system, wherein the foreign event data is adapted via metric classification, wherein the metric classification identifies differences between a format of the subject event data and a format of the foreign event data and performs an action to eliminate the differences;

identifying a first shape of the first event data, wherein identifying the first shape of the first event data includes graphing the first event data on a first graph;

identifying a second shape of the adapted second event data, wherein identifying the second shape of the adapted second event data includes graphing the adapted second event data on a second graph;

calculating a shape similarity between the first shape and the second shape, wherein calculating the shape similarity includes inputting the first graph and the second graph into an image-processing neural network, wherein the image-processing neural network analyzes a picture of the first graph and a picture of the second graph and assigns a first overall shape to an aggregation of data points plotted on the first graph and assigns a second overall shape to an aggregation of data points plotted on the second graph;

determining that the shape similarity is above a similarity threshold, wherein determining that the shape similarity is above the similarity threshold includes using the image-processing neural network to overlay the first overall shape and the second overall shape on top of each other and to compute a number of pixels between the first overall shape and the second overall shape that overlap and a number of pixels between the first overall shape and the second overall shape that do not overlap;

generating, based on the determining, training features from the first event data and the adapted second event data; and inputting the training features into the anomaly-detection model.

2. The method of claim 1, further comprising:

equalizing a measurement window between the first event data and the second event data.

3. The method of claim 1, further comprising:

equalizing a measurement frequency between the first event data and the second event data.

4. The method of claim 1, further comprising:

plotting the second event data on a cartesian coordinate system;

eliminating outlier data from the second event data; and converting the cartesian coordinate system to a polar coordinate system.

5. The method of claim 4, wherein the training features are generated, in part, from the second event data using the polar coordinate system.

6. The method of claim 4, wherein the method further comprises:

identifying a reference distance data point in the second event data in the polar coordinate system;

expressing a distance between a remaining data point on the polar coordinate system as a proportion of the distance between the reference distance data point and a pole on the polar coordinate system.

7. The method of claim 1, wherein the inputting causes the anomaly-detection model to be trained to detect anomalies in computer systems, and wherein the method further comprises: utilizing the anomaly-detection model, after the inputting, to detect anomalies in a third computer system.

8. A system comprising:

a processor; and a memory in communication with the processor, the memory containing program instructions that, when executed by the processor, are configured to cause the processor to perform a method, the method comprising:

obtaining first event data for a first computer system, wherein the first computer system is a computer system for which an anomaly-detection model is being trained, wherein the first event data includes subject event data originating from the first computer system;

obtaining second event data for a second computer system, wherein the second computer system is a computer system other than the first computer system, wherein the second event data includes foreign event data originating from the second computer system, wherein the foreign event data is adapted via metric classification, wherein the metric classification identifies differences between a format of the subject event data and a format of the foreign event data and performs an action to eliminate the differences;

identifying a first shape of the first event data, wherein identifying the first shape of the first event data includes graphing the first event data on a first graph;

identifying a second shape of the adapted second event data, wherein identifying the second shape of the adapted second event data includes graphing the adapted second event data on a second graph;

calculating a shape similarity between the first shape and the second shape, wherein calculating the shape similarity includes inputting the first graph and the second graph into an image-processing neural network, wherein the image-processing neural network analyzes a picture of the first graph and a picture of the second graph and assigns a first overall shape to an aggregation of data points plotted on the first graph and assigns a second overall shape to an aggregation of data points plotted on the second graph;

determining that the shape similarity is above a similarity threshold, wherein determining that the shape similarity is above the similarity threshold includes using the image-processing neural network to overlay the first overall shape and the second overall shape on top of each other and to compute a number of pixels between the first overall shape and the second overall shape that overlap and a number of pixels between the first overall shape and the second overall shape that do not overlap;

generating, based on the determining, training features from the first event data and the adapted second event data; and inputting the training features into the anomaly-detection model.

9. The system of claim 8, wherein the method performed by the processor further comprises equalizing a measurement window between the first event data and the second event data.

10. The system of claim 8, wherein the method performed by the processor further comprises equalizing a measurement frequency between the first event data and the second event data.

11. The system of claim 8, wherein the method performed by the processor further comprises identifying a reference distance data point in the first event data in a polar coordinate system; and expressing a distance between a remaining data point on the polar coordinate system as a proportion of the distance between the reference distance data point and a pole on the polar coordinate system.

12. A computer program product, the computer program product comprising a computer readable storage medium having program instructions embodied therewith, the program instructions executable by a computer to cause the computer to:

obtain first event data for a first computer system, wherein the first computer system is a computer system for which an anomaly-detection model is being trained, wherein the first event data includes subject event data originating from the first computer system;

obtain second event data for a second computer system, wherein the second computer system is a computer system other than the first computer system, wherein the second event data includes foreign event data originating from the second computer system, wherein the foreign event data is adapted via metric classification, wherein the metric classification identifies differences between a format of the subject event data and a format of the foreign event data and performs an action to eliminate the differences;

identify a first shape of the first event data, wherein identifying the first shape of the first event data includes graphing the first event data on a first graph;

identify a second shape of the adapted second event data, wherein identifying the second shape of the adapted second event data includes graphing the adapted second event data on a second graph;

calculate a shape similarity between the first shape and the second shape, wherein calculating the shape similarity includes inputting the first graph and the second graph into an image-processing neural network, wherein the image-processing neural network analyzes a picture of the first graph and a picture of the second graph and assigns a first overall shape to an aggregation of data points plotted on the first graph and assigns a second overall shape to an aggregation of data points plotted on the second graph;

determine that the shape similarity is above a similarity threshold, wherein determining that the shape similarity is above the similarity threshold includes using the image-processing neural network to overlay the first overall shape and the second overall shape on top of each other and to compute a number of pixels between the first overall shape and the second overall shape that overlap and a number of pixels between the first overall shape and the second overall shape that do not overlap;

generate, based on the determining, training features from the first event data and the adapted second event data; and input the training features into the anomaly-detection model.

13. The computer program product of claim 12, wherein the program instructions are further executable by the computer to cause the computer to equalize a measurement window between the first event data and the second event data.

14. The computer program product of claim 12, wherein the program instructions are further executable by the computer to cause the computer to equalize a measurement frequency between the first event data and the second event data.

15. The computer program product of claim 12, wherein the program instructions are further executable by the computer to:

plot the second event data on a cartesian coordinate system;

eliminate outlier data from the second event data; and convert the cartesian coordinate system to a polar coordinate system.

* * * * *